US007934377B2

(12) United States Patent
Kim et al.

(10) Patent No.: US 7,934,377 B2
(45) Date of Patent: May 3, 2011

(54) APPARATUS FOR EASING IMPACT ON BOOM OF EXCAVATOR AND METHOD OF CONTROLLING THE SAME

(75) Inventors: Dong Soo Kim, Changwon-si (KR); Jae Hoon Lee, Changwon-si (KR); Chun Seung Lee, Changwon-si (KR); Jae Hong Kim, Gyeongsan-si (KR); Joong Seon Joh, Changwon-si (KR); Eun Tae Jeung, Changwon-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 571 days.

(21) Appl. No.: 11/977,650

(22) Filed: Oct. 25, 2007

(65) Prior Publication Data

US 2008/0155977 A1 Jul. 3, 2008

(30) Foreign Application Priority Data

Dec. 28, 2006 (KR) ........................ 10-2006-0136156

(51) Int. Cl.
*F16D 31/02* (2006.01)

(52) U.S. Cl. ........................................................ 60/469

(58) Field of Classification Search ..................... 60/469
See application file for complete search history.

(56) References Cited

U.S. PATENT DOCUMENTS 5,333,533 A * 8/1994 Hosseini ........................ 60/469

* cited by examiner

*Primary Examiner* — F. Daniel Lopez
(74) *Attorney, Agent, or Firm* — Ladas & Parry LLP

(57) ABSTRACT

An apparatus for easing an impact on a boom of an excavator and a method of controlling the same are disclosed, which can minimize the vibration occurring in the boom due to the impact on a boom cylinder by actively controlling an amount of hydraulic fluid being supplied to the boom cylinder when the operation of the boom cylinder is suddenly stopped due to an operator's sudden manipulation of an operation lever for a working device. The apparatus includes first and second hydraulic pumps; a boom cylinder; a main control valve; an operation lever for supplying pilot signal pressure to a spool of the main control valve when an operator manipulates the operation lever; operation lever detection means for detecting boom up and boom down signal pressures according to an amount of manipulation of the operation lever; boom cylinder pressure detection means for detecting pressures generated in a large chamber and a small chamber of the boom cylinder; a controller for calculating and outputting a control signal of the main control valve if the boom cylinder has been suddenly stopped; and boom vibration preventing means for controlling the pilot signal pressure being supplied from the second hydraulic pump to the main control valve.

2 Claims, 5 Drawing Sheets

APPARATUS FOR EASING IMPACT ON BOOM OF EXCAVATOR AND METHOD OF CONTROLLING THE SAME

CROSS-REFERENCE TO RELATED APPLICATION

This application is based on and claims priority from Korean Patent Application No. 10-2006-0136156, filed on Dec. 28, 2006, in the Korean Intellectual Property Office, the disclosure of which is incorporated herein in its entirety by reference.

BACKGROUND OF THE INVENTION

1. Field of the Invention

The present invention relates to an apparatus for easing an impact on a boom of an excavator and a method of controlling the same, which can minimize the impact and vibration occurring in the boom when the operation of a boom cylinder for driving the boom of the excavator is suddenly stopped.

More particularly, the present invention relates to an apparatus for easing an impact on a boom of an excavator and a method of controlling the same, which can minimize the vibration occurring in the boom due to the impact on a boom cylinder by actively controlling an amount of hydraulic fluid being supplied to the boom cylinder when the operation of the boom cylinder is suddenly stopped due to an operator's sudden manipulation of an operation lever for a working device.

2. Description of the Prior Art

Generally, a working device such as a boom of an excavator is driven by manipulating an operation lever. A skilled operator can smoothly operate the working device by precisely manipulating the operation lever, so that an impact on an actuator (e.g., a boom cylinder) can be eased. By contrast, an unskilled operator who has a narrow experience in operation cannot finely manipulate the operation lever, but is apt to suddenly manipulate the operation lever, so that the impact due to the inertia of the working device occurs when the operation lever is suddenly manipulated to lower the working efficiency.

In addition, in the case of suddenly manipulating the operation lever for the working device to improve the working efficiency, vibration is generated due to the impact on the working device during the startup or stop of the working device. This vibration increases the operator's work fatigue to lower the working efficiency, and lowers the durability of the device to shorten the life span of the device.

As shown in FIG. 1, a conventional apparatus for easing an impact on a boom of an excavator includes, a hydraulic pump 50, a pilot pump 53, a boom cylinder 51, connected to the hydraulic pump 50, for being driven when hydraulic fluid is supplied thereto, a main control valve 52, installed in a flow path between the hydraulic pump 50 and the boom cylinder 51, for controlling a startup, stop, and turnabout of the boom cylinder 51, a control valve, installed in a flow path between the pilot pump 53 and the main control valve 52, for being switch when an electric signal is inputted from an outside, and controlling pilot signal pressure being supplied to the main control valve 52, pressure sensors 55 and 56 for detecting operating pressure of a large chamber 51*a* and a small chamber 51*b* of the boom cylinder 51, a relay switch 57 for inputting the electric signal to switch a spool of the control valve 54, and a controller 58 for judging whether the boom cylinder has been suddenly stopped in accordance with input signals from the pressure sensors 55 and 56, and if it is judged that the boom cylinder 51 has been suddenly stopped, outputting a drive signal to the relay switch 57.

The controller 58 judges whether the boom cylinder 51 has been suddenly stopped in accordance with the operating pressure values of the large chamber 51*a* and the small chamber 51*b* of the boom cylinder 51 outputted from the pressure sensors 55 and 56. If it is judged that the boom cylinder 51 has been suddenly stopped, the controller 58 output the drive signal to the relay switch 57.

The relay switch 57, which has received the drive signal, switches the spool of the control valve 54 to an upper side as shown in the drawing. In this case, the pilot signal pressure discharged from the pilot pump 53 is supplied to the main control valve 52 via the switched control valve 54, and switches the spool of the main control valve 52 to a right side as shown in the drawing.

Accordingly, the hydraulic fluid discharged from the hydraulic pump 50 is supplied to the large chamber 51*a* of the boom cylinder via the switched main control valve 52. In this case, the hydraulic fluid from the small chamber 51*b* of the boom cylinder 51 is returned to a hydraulic tank via the main control valve 52.

However, the conventional apparatus for easing an impact on a boom has the problems that in the case where the controller 58 judges that the boom cylinder 51 has been suddenly stopped, a separate relay switch 57 is used to input the electric signal for switching the spool of the control valve 54, and this causes the number of components of the apparatus to be increased with the manufacturing cost increased.

SUMMARY OF THE INVENTION

Accordingly, the present invention has been made to solve the above-mentioned problems occurring in the prior art while advantages achieved by the prior art are maintained intact.

One object of the present invention is to provide an apparatus for easing an impact on a boom of an excavator and a method of controlling the same, which can lengthen the life span of equipment and reduce operator's work fatigue by minimizing vibration occurring in the boom due to the impact on a boom cylinder when the operation of the boom cylinder is suddenly stopped due to an operator's sudden manipulation of an operation lever for a working device.

Another object of the present invention is to provide an apparatus for easing an impact on a boom of an excavator and a method of controlling the same, which enables even an unskilled operator to easily manipulate a working device and thus can improve the work efficiency.

In order to accomplish these objects, there is provided an apparatus for easing an impact on a boom of an excavator, according to the present invention, which includes first and second hydraulic pumps; a boom cylinder connected to the first hydraulic pump; a main control valve, installed in a flow path between the first hydraulic pump and the boom cylinder, for being switched when pilot signal pressure is supplied from an outside, and controlling startup, stop, and turnabout of the boom cylinder; an operation lever for supplying the pilot signal pressure from the second hydraulic pump to a spool of the main control valve when an operator manipulates the operation lever; operation lever detection means for detecting boom up and boom down signal pressures according to an amount of manipulation of the operation lever; boom cylinder pressure detection means for detecting pressures generated in a large chamber and a small chamber of the boom cylinder; a controller for receiving an input of detected signals from the boom cylinder pressure detection means and the operation lever detection means, and if it is judged that the boom cylinder has been suddenly stopped in accordance with the input signals, calculating and outputting a control signal of the boom cylinder; and boom vibration preventing means, installed in a pilot flow path between the second hydraulic pump and the operation lever, for being switchable in accordance with the signals inputted from the controller, and controlling the pilot signal pressure being supplied from the second hydraulic pump to a boom up spool of the main control valve.

The boom vibration preventing means may comprise a solenoid valve for being switched in accordance with the electric signal inputted from the controller if it is judged that the boom cylinder has been suddenly stopped during a boom up operation due to a sudden manipulation of the operation lever, and controlling whether to supply the pilot signal pressure from the second hydraulic pump to a boom up spool of the main control valve.

The boom vibration preventing means may comprise a solenoid valve for being switched in accordance with the electric signal inputted from the controller if it is judged that the boom cylinder has been suddenly stopped during a boom down operation due to a sudden manipulation of the operation lever, and controlling whether to supply the pilot signal pressure from the second hydraulic pump to a boom down spool of the main control valve.

The boom vibration preventing means may comprise an electro proportional pressure reducing valve for being switched in accordance with the electric signal inputted from the controller if it is judged that the boom cylinder has been suddenly stopped during a boom up operation due to a sudden manipulation of the operation lever, and variably adjusting the pilot signal pressure being supplied from the second hydraulic pump to a boom up spool of the main control valve.

The boom vibration preventing means may comprise an electro proportional pressure reducing valve for being switched in accordance with the electric signal inputted from the controller if it is judged that the boom cylinder has been suddenly stopped during a boom down operation due to a sudden manipulation of the operation lever, and variably adjusting the pilot signal pressure being supplied from the second hydraulic pump to a boom down spool of the main control valve.

The apparatus for easing an impact on a boom of an excavator according to embodiments of the present invention may further include shuttle valves, installed in a pilot flow path between the operation lever and the electro proportional pressure reducing valves, for selecting the relatively large pilot signal pressure between the pilot signal pressure having passed through the operation lever and the pilot signal pressure having passed through the electro proportional pressure reducing valves.

In another aspect of the present invention, there is provided a method of controlling an apparatus for easing an impact on a boom of an excavator, including a boom cylinder connected to a hydraulic pump, a main control valve for controlling hydraulic fluid being supplied to the boom cylinder, an operation lever for generating an operation signal for driving the boom cylinder, operation lever detection means for detecting boom up and boom down signal pressures according to an amount of manipulation of the operation lever, boom cylinder pressure detection means for detecting pressures generated in a large chamber and a small chamber of the boom cylinder, a controller for receiving an input of detected signals from the boom cylinder pressure detection means and the operation lever detection means, and electro proportional pressure reducing valves for controlling the pilot signal pressure being supplied to the main control valve, the method including receiving an input of the boom up and boom down signal pressures from the operation lever detection means and the operating pressures of the boom cylinder from the boom cylinder pressure detection means; obtaining a reduction rate of manipulation of the operation lever for a predetermined time in accordance with the received input of the boom up and boom down signal pressures, and judging that the operation lever has been suddenly stopped if the obtained value of the reduction rate is smaller than a predetermined value; receiving the pressure value of the compression chamber of the boom cylinder when the boom is stopped, comparing the received pressure value with a predetermined value, and predicting a boom vibration if the received pressure value is larger than the predetermined value; calculating and outputting a control value of the electro proportional pressure reducing valve so as to drive a spool of the main control valve of the operation lever if the boom vibration is predicted due to the sudden stop of the operation lever; and predicting an end of the boom vibration by checking a difference in pressure between the compression chamber and the expansion chamber of the boom cylinder when the boom is stopped, and controlling the electro proportional pressure reducing valve to be stopped.

In a preferred embodiment of the present invention, it is judged that the boom cylinder has been suddenly stopped in the case where the boom up signal pressure is smaller than the pressure value Pcr when the boom cylinder is stopped, and the reduced amount of manipulation of the operation lever is smaller than the predetermined value Rcr.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
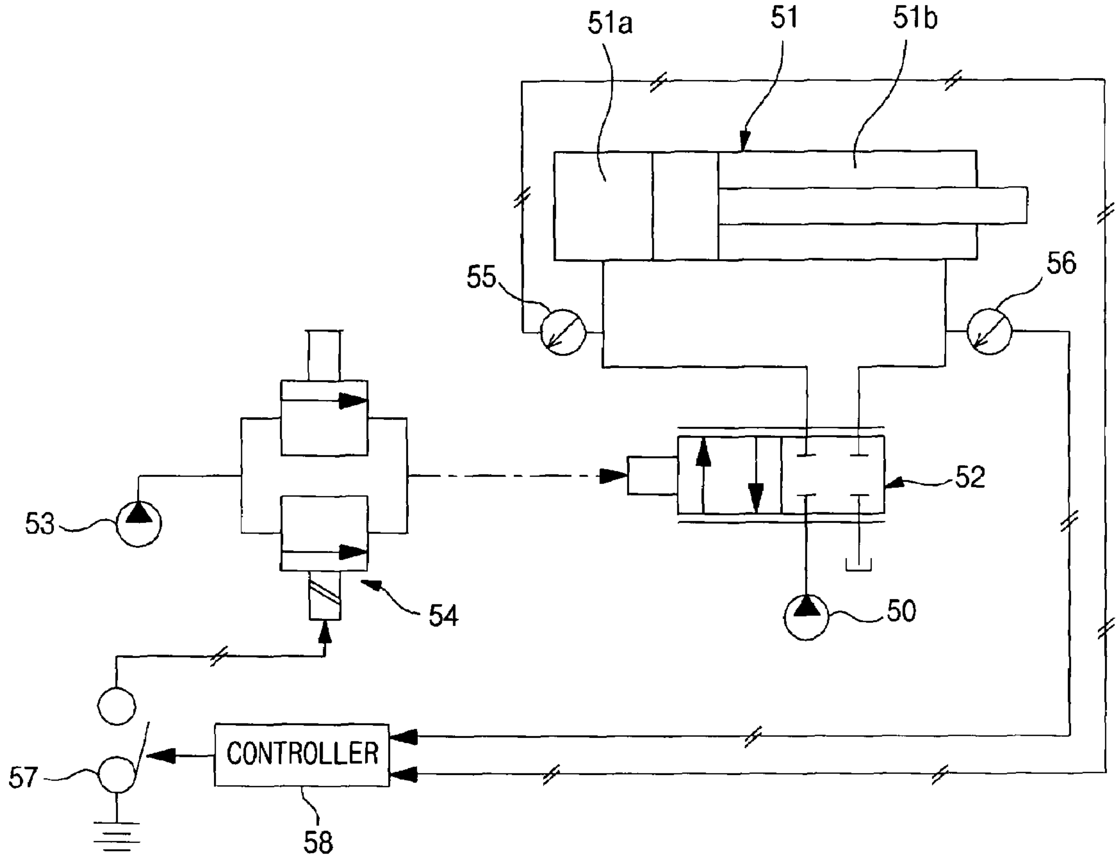
Fig. 1 Prior Art
FIG. 1 is a schematic view of a conventional apparatus for easing an impact on a boom of an excavator.
Figure 2:
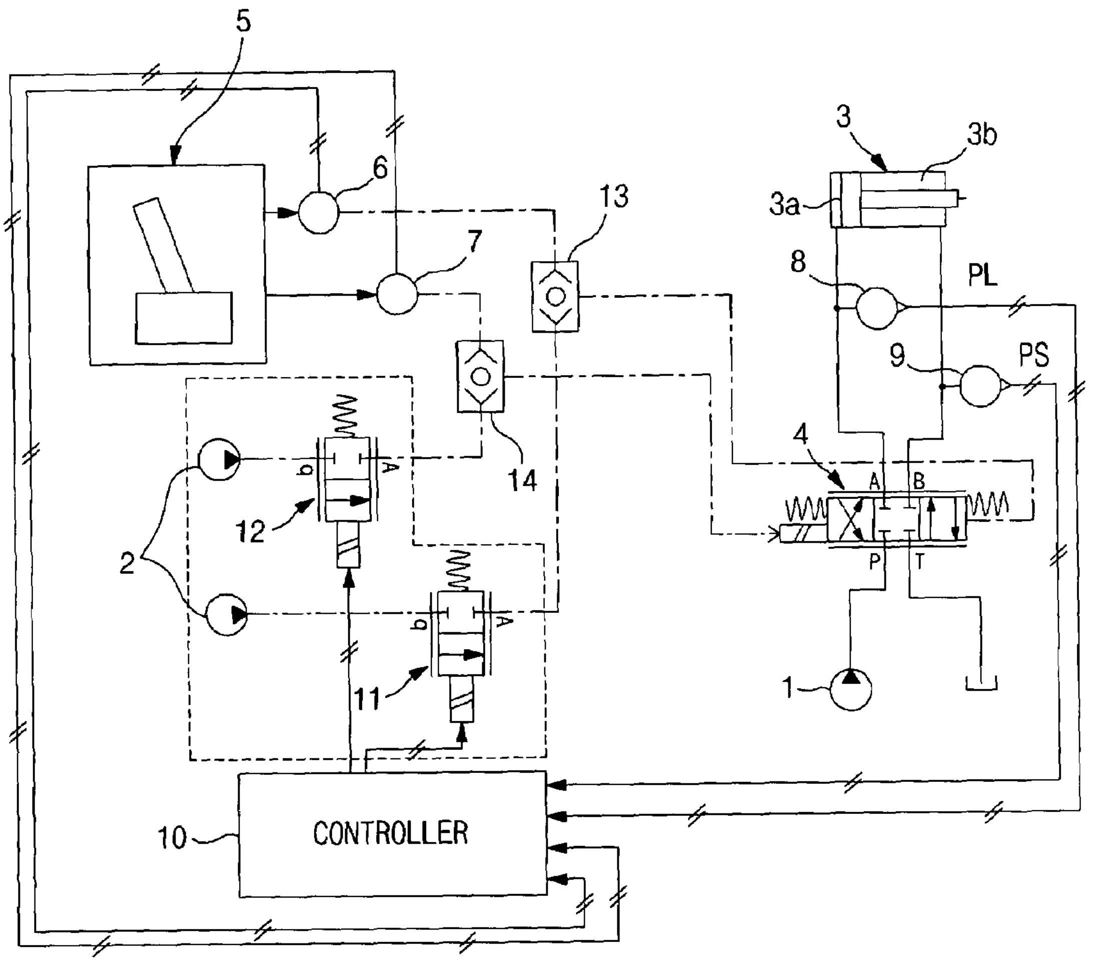
FIG. 2 is a diagram of a hydraulic circuit of an apparatus for easing an impact on a boom of an excavator according to an embodiment of the present invention.

As shown in FIG. 2, an apparatus for easing an impact on a boom of an excavator according to an embodiment of the present invention includes a first hydraulic pump 1 and a second hydraulic pump (i.e., a pilot hydraulic pump) 2 connected to an engine (not illustrated); a boom cylinder 3, connected to the first hydraulic pump 1, for being driven when hydraulic fluid is supplied thereto; a main control valve (MCV) 4, installed in a flow path between the first hydraulic pump 1 and the boom cylinder 3, for being switched when pilot signal pressure is supplied from an outside, and controlling startup, stop, and turnabout of the boom cylinder 3; an operation lever (RCV) 5 for supplying the pilot signal pressure from the second hydraulic pump 2 to a spool of the main control valve 4 when an operator manipulates the operation lever; and operation lever detection means (i.e., boom up pressure sensor and a boom down pressure sensor) 6 and 7 for detecting boom up and boom down signal pressures according to an amount of manipulation of the operation lever 5.

The apparatus further includes boom cylinder pressure detection means (i.e., a pressure sensor installed in a flow path between a large chamber 3*a* and the main control valve 4, and a pressure sensor installed in a flow path between a small chamber 3*b* and the main control valve 4) 8 and 9 for detecting operating pressures generated in the large chamber 3*a* and the small chamber 3*b* of the boom cylinder 3; a controller 10 for receiving an input of detected signals from the boom cylinder pressure detection means 8 and 9 and the operation lever detection means 6 and 7, and if it is judged that the boom cylinder 3 has been suddenly stopped in accordance with the input signals, calculating and outputting a control signal of the boom cylinder 3; and boom vibration preventing means, installed in a pilot flow path between the second hydraulic pump 2 and the operation lever 5, for being switchable in accordance with the signals inputted from the controller 10, and controlling the pilot signal pressure being supplied from the second hydraulic pump 2 to the boom up spool of the main control valve 4, for being switchable in direction of the boom up operation.

The boom vibration preventing means may be an electro proportional pressure reducing valve (PPRV) 11 for being switched in accordance with the electric signal inputted from the controller 10 if it is judged that the boom cylinder 3 has been suddenly stopped during a boom up operation due to a sudden manipulation of the operation lever 5, and variably adjusting the pilot signal pressure being supplied from the second hydraulic pump 2 to a boom up spool of the main control valve 4 (i.e., adjusting displacement of the spool).

The boom vibration preventing means may be an electro proportional pressure reducing valve (PPRV) 12 for being switched in accordance with the electric signal inputted from the controller 10 if it is judged that the boom cylinder 3 has been suddenly stopped during a boom down operation due to a sudden manipulation of the operation lever 5, and variably adjusting the pilot signal pressure being supplied from the second hydraulic pump 2 to a boom down spool of the main control valve 4.

The apparatus for easing an impact on a boom of an excavator according to embodiments of the present invention further includes shuttle valves 13 and 14, installed in pilot flow paths between the operation lever 5 and the electro proportional pressure reducing valves 11 and 12, for selecting the relatively large pilot signal pressure between the pilot signal pressure having passed through the operation lever and the pilot signal pressure having passed through the electro proportional pressure reducing valves 11 and 12.

Although not illustrated in the drawing, the boom vibration preventing means may be a solenoid valve for being switched in accordance with the electric signal inputted from the controller 10 if it is judged that the boom cylinder 3 has been suddenly stopped during a boom up operation due to a sudden manipulation of the operation lever 5, and controlling whether to supply the pilot signal pressure from the second hydraulic pump 2 to a boom up spool of the main control valve 4.

Also, the boom vibration preventing means may be a solenoid valve for being switched in accordance with the electric signal inputted from the controller 10 if it is judged that the boom cylinder 3 has been suddenly stopped during a boom down operation due to a sudden manipulation of the operation lever 5, and controlling whether to supply the pilot signal pressure from the second hydraulic pump 2 to a boom down spool of the main control valve 4 (i.e., controlling on/off state of the spool).

Hereinafter, the apparatus for easing an impact of a boom of an excavator according to an embodiment of the present invention will be described in detail with reference to the accompanying drawings.

As illustrated in FIG. 2, when an operator operates the operation lever (RCV) 5 to lift the boom, a boom up signal pressure, which is supplied from the second hydraulic pump 2 through the operation lever 5 in accordance with the amount of manipulation of the operation lever 5, is detected by the operation lever detection means (i.e., pressure sensor) 6, and is supplied to the controller 10. The pilot signal pressure supplied to the controller 10 is converted into a control signal for driving the electro proportional pressure reducing valve 11.

The pilot signal pressure according to the amount of manipulation of the operation lever 5 is supplied to the boom up spool of the main control valve 4 through the shuttle valve 13, and the internal spool is switched to the left side as shown in the drawing. Accordingly, the operating pressure being discharged from the first hydraulic pump 1 is supplied to the large chamber 3*a* of the boom cylinder 3 via the switch main control valve 4. At this time, the hydraulic fluid from the small chamber 3*b* of the boom cylinder 3 is returned to the hydraulic tank 15 via the main control valve 4.

The operating pressures of the large chamber 3*a* and the small chamber 3*b* respectively detected by the boom cylinder pressure detection means 8 and 9 installed in the flow path of the large chamber 3*a* and the flow path of the small chamber 3*b* are supplied to the controller 10. The operating pressure supplied to the controller 10 is converted into the control signal for driving the electro proportional pressure reducing valve 11.

Accordingly, the boom (not illustrated) is lifted by the extension operation of the boom cylinder 3.

As illustrated in FIG. 2, when the operator manipulates the operation lever 5 to lower the boom, a boom down signal pressure, which is supplied from the second hydraulic pump 2 through the operation lever 5 in accordance with the amount of manipulation of the operation lever 5, is detected by the operation lever detection means 7, and is supplied to the controller 10. The pilot signal pressure supplied to the controller 10 is converted into a control signal for driving the electro proportional pressure reducing valve 12.

The pilot signal pressure according to the amount of manipulation of the operation lever 5 is supplied to the boom down spool of the main control valve 4 through the shuttle valve 14, and the internal spool is switched to the right side as shown in the drawing. Accordingly, the operating pressure being discharged from the first hydraulic pump 1 is supplied to the small chamber 3*b* of the boom cylinder 3 via the switch main control valve 4. At this time, the hydraulic fluid from the large chamber 3*a* of the boom cylinder 3 is returned to the hydraulic tank 15 via the main control valve 4.

The operating pressures detected by the boom cylinder pressure detection means 8 and 9 installed in the flow path of the large chamber 3*a* and the flow path of the small chamber 3*b* of the boom cylinder 3 are supplied to the controller 10. The operating pressure supplied to the controller 10 is converted into the control signal for driving the electro proportional pressure reducing valve 12.

Accordingly, the boom (not illustrated) is lowered by the contraction operation of the boom cylinder 3.

On the other hand, if the boom cylinder 3 has been suddenly stopped during the boom up operation by the extension operation of the boom cylinder 3, the operating pressure being supplied to the boom cylinder 3 according to the control signal from the controller 10 is actively adjusted, and thus the generation of boom vibration due to the sudden stop of the boom cylinder 3 can be minimized.

Specifically, the controller judges whether the boom cylinder 3 has been suddenly stopped by comparing the boom up signal pressure being supplied from the operation lever detection means (e.g., the pressure sensor) 6 to the controller 10 with the operating pressure of the boom cylinder 3 being supplied from the boom cylinder pressure detection means 8 to the controller 10.

If it is judged that the boom cylinder 3 has been suddenly stopped (at this time, the operating pressure of the large chamber 3*a* is lowered and the operating pressure of the small chamber 3*b* is heightened) (it is judged that the boom cylinder 3 has been suddenly stopped in the case where the boom up signal pressure is smaller than the pressure value Pcr when the boom cylinder 3 is stopped, and the reduced amount of manipulation of the operation lever 5 is smaller than the predetermined value Rcr), the controller 10 outputs the electric control signal to the electro proportional pressure reducing valve 11 to switch the valve 11 to an upper side as shown in the drawing.

Accordingly, the pilot signal pressure being discharged from the second hydraulic pump 2 is supplied to the shuttle valve 13 via the switched electro proportional pressure reducing valve 11. Simultaneously, the boom up signal pressure corresponding to the amount of manipulation of the operation lever 5 is supplied to the shuttle valve 13.

Then, a relatively large one between the pilot signal pressure having passed through the electro proportional pressure reducing valve 11 and the boom up signal pressure having passed through the operation lever 5 is supplied to the boom up spool of the main control valve 4. This causes the spool of the main control valve 4 to be switched to a left side as shown in the drawing.

Accordingly, the operating pressure from the first hydraulic pump 1 is supplied to the large chamber 3*a* of the boom cylinder 3 via the switched main control valve 4. At this time, the hydraulic fluid from the small chamber 3*b* of the boom cylinder 3 is returned to the hydraulic tank 15 via the main control valve 4.

That is, in accordance with the movement of the spool of the main control valve 4, the pressure of the small chamber 3*b* of the boom cylinder 3 is reduced. Due to this, the difference in pressure between the large chamber 3*a* and the small chamber 3*b* of the boom cylinder 3, in which the boom vibration is generated, is reduced, and thus the boom vibration generated due to the sudden stop of the boom cylinder 3 during the boom up operation can be suppressed.

On the other hand, if the boom cylinder 3 has been suddenly stopped during the boom down operation by the manipulation of the operation lever 5, the controller judges whether the boom cylinder 3 has been suddenly stopped by comparing the boom down signal pressure being supplied from the operation lever detection means (e.g., the pressure sensor) 7 with the operating pressure of the boom cylinder 3 being supplied from the boom cylinder pressure detection means 9.

If it is judged that the boom cylinder 3 has been suddenly stopped during the boom down operation, the operating pressure being supplied to the small chamber 3*b* of the boom cylinder 3 is actively adjusted by adjusting the amount of switchover of the spool of the main control valve 4 in accordance with the control signal outputted from the controller 10. Since the suppression of the boom vibration generated due to the sudden stop of the boom cylinder 3 substantially corresponds to the adjustment of the amount of hydraulic fluid being supplied to the boom cylinder 3 when the boom cylinder 3 is suddenly stopped, the detailed description thereof will be omitted.

Hereinafter, the method of controlling the apparatus for easing an impact of a boom of an excavator according to an embodiment of the present invention will be described in detail with reference to the accompanying drawings.

Figure 3:
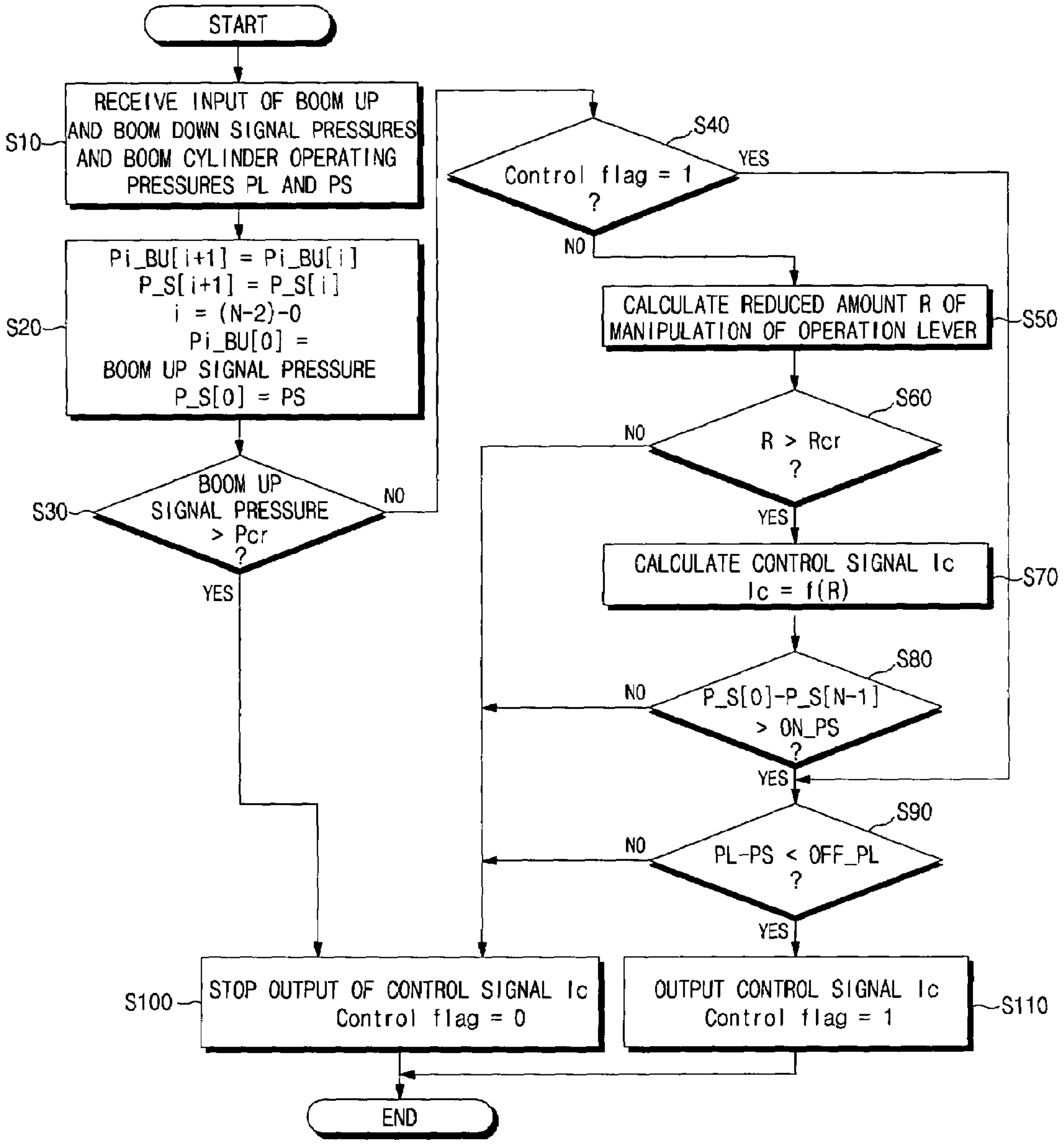
FIG. 3 is a flowchart illustrating a method of controlling the apparatus for easing an impact on a boom of an excavator according to an embodiment of the present invention.
Figure 4:
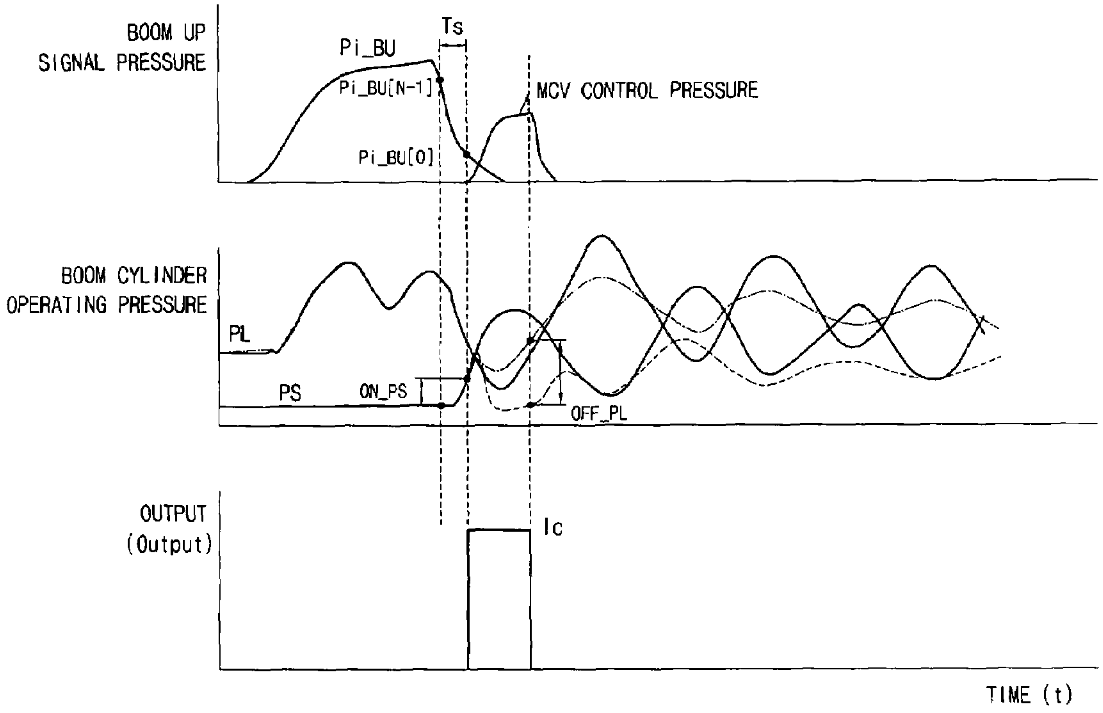
FIG. 4 is a view explaining time for supplying hydraulic fluid to a boom cylinder in the case of a sudden stop of boom ascending in the apparatus for easing an impact on a boom of an excavator according to an embodiment of the present invention.

As illustrated in FIG. 3, the operation lever detection means 6 detects the boom up signal pressure according to the amount of manipulation of the operation lever 5. The boom cylinder pressure detection means 8 and 9 detect the operating pressure of the small chamber 3*b* and the operating pressure of the large chamber 3*a* of the boom cylinder 3 (S10). The detected signals of the boom up signal pressure and the operating pressure of the boom cylinder 3 are inputted to the controller 10.

The controller 10 converts the boom up signal pressure and the operating pressure of the boom cylinder 3 inputted thereto into control signals capable of driving the electro proportional pressure reducing valve 11 and stores the control signals (S20).

$$Pi\_BU[i+1]=Pi\_BU[i]$$

$$P\_S[i+1]=P\_S[i]$$

$$i=(N-2)\approx 0$$

$$\mathrm{P\_S[0]=PS}$$

The controller 10 compares the boom up signal pressure with a predetermined pressure value Pcr in a state that the boom cylinder 3 is stopped, and if the boom up signal pressure value is larger than the predetermined pressure value Pcr, it proceeds to step S100 (corresponding to the case that the control signal Ic from the controller 10 is not outputted to the electro proportional pressure reducing valve 11) and terminates the loop (S30).

If the boom up signal pressure value is smaller than the predetermined pressure value Pcr, the controller judges whether the control value has been outputted (in this case, control flag=1), and if the control value has not been outputted, it proceeds to the next step (S40).

If the control value has not been outputted, the controller calculates the reduced amount R of manipulation of the operation lever 5 (R=Pi_BU[N−1]−Pi_BU[0]) (S50).

If it is assumed that Ts=0.5 sec, the controller calculates the reduced amount R of the operation lever 5 by checking the difference between the operating pressure of the small chamber 3*b* before 0.5 sec and the current operating pressure of the small chamber 3*b* of the boom cylinder 3.

The controller judges whether the boom cylinder 3 has been suddenly stopped by comparing the reduced amount R of manipulation of the operation lever 5 with the predetermined value Rcr (S60). That is, if the reduced amount R of manipulation of the operation lever 5 is smaller than the predetermined value Rcr (i.e., R<Rcr), the controller judges that the boom cylinder 3 has been suddenly stopped, and proceeds to the next step.

By contrast, if the reduced amount R of manipulation of the operation lever 5 is larger than the predetermined value Rcr (i.e., R>Rcr), the controller judges that the boom cylinder 3 has not been suddenly stopped, and proceeds to step S100 to terminate the loop.

Figure 5:
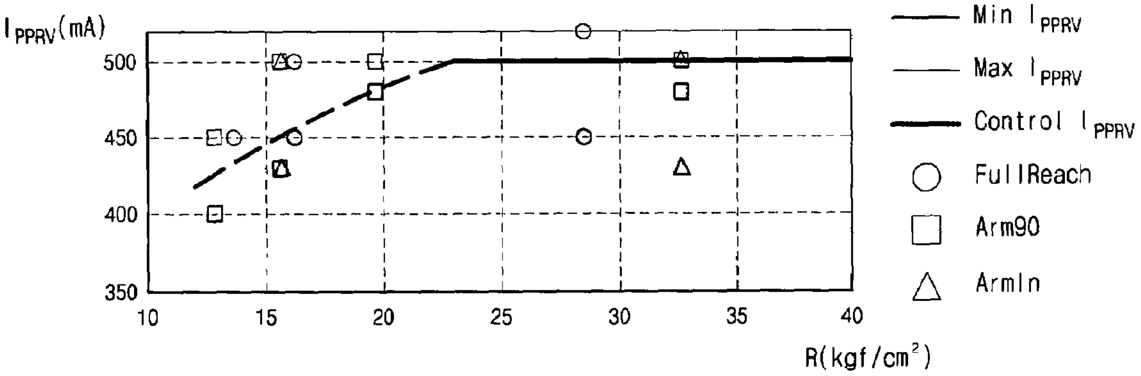
FIG. 5 is a view explaining a process of experimentally obtaining control signals for controlling a boom vibration prevention valve in various work postures, and taking an average value of the obtained control signals, in the apparatus for easing an impact on a boom of an excavator according to an embodiment of the present invention.

If it is judged that the boom cylinder 3 has been suddenly stopped during the boom up operation, the controller calculates the control signal (Ic=f(R)) that can control the electro proportional pressure reducing valve 11 according to the sudden reduction of manipulation of the operation lever 5 (S70). In this case, the control signal Ic can be obtained through a function that experimentally obtains control signals in various work postures of the boom, and takes an average value of the obtained control signals (as illustrated in FIG. 5). Also, the controller can store data in table.

The work postures of the boom include a full reach state that the boom and an arm are unfolded at maximum, an arm 90° state that the arm makes 90° with the boom, and an arm-in state that the boom and the arm are folded together. The experimental values of the control signals Ic can be obtained in a loaded state that a load is applied to the boom and in an unloaded state that no load is applied to the boom.

If the operating pressure of the small chamber 3*b* of the boom cylinder 3 is larger than the predetermined value (P_S[0]−P_S[N−1]>ON_PS) on condition that the boom cylinder 3 has been suddenly stopped, the impact and vibration can be occurred in the boom and the controller proceeds to the next step (S90).

By contrast, if the operating pressure of the small chamber 3*b* of the boom cylinder 3 is smaller than the predetermined value (P_S[0]−P_S[N−1]<ON_PS), the controller proceeds to the step S100 to terminate the loop (S80).

On condition that the boom cylinder 3 has been suddenly stopped, the controller compares the difference in operating pressure (PL−PS) between the large chamber 3*a* and the small chamber 3*b* of the boom cylinder 3 with a predetermined value (OFF_PL) (S90).

If the difference in operating pressure (PL−PS) of the boom cylinder 3 is smaller than the predetermined value (OFF_PL), the controller proceeds to the next step (S110).

By contrast, if the difference in operating pressure (PL−PS) of the boom cylinder 3 is larger than the predetermined value (OFF_PL), the controller proceeds to the step S100 to terminate the loop.

If the difference in operating pressure (PL−PS) of the boom cylinder 3 is smaller than the predetermined value, the controller 10 outputs the control signal Ic to the electro proportional pressure reducing valve 11 (S110).

In accordance with the control signal Ic from the controller 10, the spool of the electro proportional pressure reducing valve 11 is switched to an upper side. Accordingly, the pilot signal pressure being discharged from the second hydraulic pump 2 is supplied to the shuttle valve 13 via the switched electro proportional pressure reducing valve 11. Simultaneously, the boom up signal pressure according to the amount of manipulation of the operation lever 5 is supplied to the shuttle valve 13.

Then, a relatively large pilot signal pressure between the pilot signal pressure being supplied to the shuttle valve 13 through the operation lever 5 and the pilot signal pressure having passed through the electro proportional pressure reducing valve 11 is supplied to the boom up spool of the main control valve 4, and thus the internal spool of the main control valve is switched to the left side as shown in the drawing.

Accordingly, the operating pressure being discharged from the first hydraulic pump 1 is supplied to the large chamber 3*a* of the boom cylinder 3 via the switched main control valve 4.

If the previous control value is outputted at the step S40, the controller directly proceeds to the step S90 and continuously outputs the control value. Accordingly, the hydraulic fluid from the small chamber 3*b* of the boom cylinder 3 is returned to the hydraulic tank 15 through the main control valve 4, and energy being stored in the small chamber 3*b* is consumed.

By contrast, to the large chamber 3*a* of the boom cylinder 3, the hydraulic fluid from the first hydraulic pump 1 is supplied. That is, the hydraulic fluid is filled in the large chamber 3*a* so that the displacement of the boom becomes minimized when the boom is lowered due to its own weight.

Accordingly, if the difference in operating pressure between the large chamber 3*a* and the small chamber 3*b* of the boom cylinder 3 is increased, the controller proceeds from the step S90 to the step S100, and stops the output of the control signal Ic to the electro proportional pressure reducing valve 11.

On the other hand, if the boom up signal pressure is heightened due to the manipulation of the operation lever 5 at the step S20 and the controller proceeds to the step S30 after the control signal Ic is outputted to the electro proportional pressure reducing valve 11 at the step S110, the controller proceeds to the step S100 to stop the control output, and sets the control flag to "0" (i.e., control flag=0).

As described above, the apparatus for easing an impact on a boom of an excavator and the method of controlling the same according to embodiments of the present invention have the following advantages.

When the operation of the boom cylinder is suddenly stopped due to an operator's sudden manipulation of an operation lever for a working device, vibration occurring in a boom due to an impact on a boom cylinder can be minimized, and thus the durability of the heavy equipment is heightened and the operator's work fatigue is reduced to improve the workability.

In addition, not only a skilled operator but also an unskilled operator can easily operate a working device to improve the work efficiency.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of controlling an apparatus for easing an impact on a boom of an excavator, including a boom cylinder connected to a hydraulic pump, a main control valve for controlling hydraulic fluid being supplied to the boom cylinder, an operation lever for generating an operation signal for driving the boom cylinder, operation lever detection means for detecting boom up and boom down signal pressures according to an amount of manipulation of the operation lever, boom cylinder pressure detection means for detecting pressures generated in a large chamber and a small chamber of the boom cylinder, a controller for receiving an input of detected signals from the boom cylinder pressure detection means and the operation lever detection means, and electro proportional pressure reducing valves for controlling the pilot signal pressure being supplied to the main control valve, the method comprising:

receiving an input of the boom up and boom down signal pressures from the operation lever detection means and the operating pressures of the boom cylinder from the boom cylinder pressure detection means;

obtaining a reduction rate of manipulation of the operation lever for a predetermined time in accordance with the received input of the boom up and boom down signal pressures, and judging that the operation lever has been suddenly stopped if the obtained value of the reduction rate is smaller than a predetermined value;

receiving the pressure value of the compression chamber of the boom cylinder when the boom is stopped, comparing the received pressure value with a predetermined value, and predicting a boom vibration if the received pressure value is larger than the predetermined value;

calculating and outputting a control value of the electro proportional pressure reducing valve so as to drive a spool of the main control valve if the boom vibration is predicted due to the sudden stop of the operation lever; and predicting an end of the boom vibration by checking a difference in pressure between the compression chamber and the expansion chamber of the boom cylinder when the boom is stopped, and controlling the output of the electro proportional pressure reducing valve to be stopped.

2. The method of claim 1, further comprising:

judging that the boom cylinder has been suddenly stopped, if a boom up signal pressure is smaller than the pressure value when the boom cylinder has been stopped and the reduced amount of manipulation of the operation lever is smaller than the predetermined value Rcr.

* * * * *